(12) United States Patent
Pursifull

(10) Patent No.: US 11,689,011 B2
(45) Date of Patent: Jun. 27, 2023

(54) METHODS AND SYSTEMS FOR ELECTRICAL SYSTEM MONITORING AND/OR CONTROL

(71) Applicant: 1st Step Solar, Dearborn, MI (US)

(72) Inventor: Paul Pursifull, Dearborn, MI (US)

(73) Assignee: 1st Step Solar, Dearborn, MI (US)

( * ) Notice: Subject to any disclaimer, the term of this patent is extended or adjusted under 35 U.S.C. 154(b) by 0 days.

(21) Appl. No.: 17/030,055

(22) Filed: Sep. 23, 2020

(65) Prior Publication Data
US 2021/0091556 A1 Mar. 25, 2021

Related U.S. Application Data

(60) Provisional application No. 63/019,930, filed on May 4, 2020, provisional application No. 62/904,499, filed on Sep. 23, 2019.

(51) Int. Cl.
*H02H 7/20* (2006.01)
*H02H 1/00* (2006.01)

(52) U.S. Cl.
CPC ............ *H02H 7/20* (2013.01); *H02H 1/0007* (2013.01)

(58) Field of Classification Search
CPC ......... G05F 1/67; H02J 2300/26; H02J 3/381; H02J 3/385; H02J 1/108; H02J 2300/24; H02J 3/383; Y02E 10/56; H01L 31/05; H01L 31/0504; H02S 50/10
See application file for complete search history.

(56) References Cited

U.S. PATENT DOCUMENTS

| | | | | |
|---|---|---|---|---|
| 9,143,056 | B2* | 9/2015 | Ilic | H02M 7/48 |
| 2016/0072292 | A1* | 3/2016 | Rogers | H02J 3/38 |
| | | | | 307/62 |
| 2020/0106256 | A1* | 4/2020 | Lawrence | H02H 1/0015 |
| 2021/0384721 | A1* | 12/2021 | Zhao | H02J 3/381 |
| 2022/0166213 | A1* | 5/2022 | Yu | H02J 7/35 |

FOREIGN PATENT DOCUMENTS

KR 20130011689 A * 1/2013

OTHER PUBLICATIONS

S. Rahman, H. Aburub, M. Moghaddami and A. I. Sarwat, "Reverse Power Flow Protection in Grid Connected PV Systems," SoutheastCon 2018, 2018, pp. 1-5, IEEE Xplore Digital Library [online]. [retrieved on Aug. 15, 2018]. https://ieeexplore.ieee.org/stamp/stamp.jsp?tp=&arnumber=8478882 (Year: 2018).*

Mike Coddington "Photovoltaic Systems Interconnected onto Secondary Network Distribution Systems—Success Stories". National Renewable Energy Laboratory [online]. [retrived on Apr. 2009]. https://www.nrel.gov/docs/fy09osti/45061.pdf (Year: 2009).*

* cited by examiner

*Primary Examiner* — Jared Fureman
*Assistant Examiner* — Nicolas Bellido
(74) *Attorney, Agent, or Firm* — McCoy Russell LLP

(57) ABSTRACT

A method of dedicated circuit verification using a monitoring system includes measuring current at circuit breaker, comparing breaker current with microinverter current generated from one or more solar panels and determining whether they are within a threshold amount of one another, and generating an output based on the comparison.

16 Claims, 11 Drawing Sheets

800

801

METHODS AND SYSTEMS FOR ELECTRICAL SYSTEM MONITORING AND/OR CONTROL

CROSS REFERENCE TO RELATED APPLICATIONS

The present application claims priority to U.S. Provisional Application No. 62/904,499, entitled "METHODS AND SYSTEMS FOR SOLAR SYSTEM MONITORING AND CONTROL," and filed on Sep. 23, 2019, and U.S. Provisional Application No. 63/019,930, entitled "METHODS AND SYSTEMS FOR ELECTRICAL SYSTEM MONITORING AND/OR CONTROL," filed May 4, 2020. The entire contents of the above-identified applications are hereby incorporated by reference for all purposes.

FIELD

The present disclosure relates to an electrical system monitoring and/or control, such as with respect to distributed energy resource operation, and to monitoring circuit connections in an electrical power systems.

BACKGROUND AND SUMMARY

Electric power generation can create challenges in building electrical systems. For example, photovoltaic (solar) electricity production is a method by which to convert 20% of the solar energy that strikes a photovoltaic panel into electricity. Many homes' entire annual electrical needs can be provided via solar alone. While most homeowner projects are commonly handled by the homeowner (note the ubiquity of home improvement warehouses) solar has not yet achieved this status. To catalyze this portion of the green revolution, simplified systems may be developed for integrating power generation systems, such as solar systems, to put them in easier reach of the homeowner. Plug and play power generation would include the ability to plug a small solar system directly into an existing 120 or 240 VAC outlet and would provide significant advantages to building owners.

However, the inventors herein have recognized that homeowner-installed power generation has special concerns to ensure electrical code compliance. A Distributed Energy Resource (DER) (of which solar photovoltaic panels are one example) needs to back feed a dedicated circuit to the building's power distribution panel. When solar panels' microinverters are plugged into an outlet, it is difficult to tell if an existing circuit is indeed dedicated. It is also difficult to insure that a dedicated circuit does not become a shared circuit during renovation. The National Electric Code (NEC) requires electrical generating appliances/devices to have dedicated circuits in order to avoid the scenario where having two sources of current (grid and DER) could result in the wire carrying more than the rated current. Therefore, it may be useful to have a system for detecting whether or not a circuit is shared, warning, and/or and take mitigating action if it is found to be shared. Further yet, or in the alternative, it may be advantageous to enforce that each circuit's breaker only either source or sink current. Adding some practicality to that goal would be to at least provide a circuit breaker that would only accept current and not source current (to be used with DERs, Distributed Energy Resources). This "accept current only" breaker has some interesting follow-on effects. For example, should there ever be even a high resistance short in the solar panel AC wiring, the breaker would trip. This is true of any GFCI circuit; however, in other GFCI circuits, even if the current carrying wires have a high (or low) resistance short to each other, the "accept current only" breaker trips.

Regarding dedicated versus shared (or branched) electrical circuits in buildings, there are multiple considerations. First, it may be desirable to prevent circuits from carrying more current than for which they are rated. Second, a dedicated circuit for a DER source can be required. Thus, in some examples, it is possible to limit the current anywhere and/or everywhere in the circuit to rated current. Aspects of the disclosure also help with compliance by detecting a shared circuit even when the microinverter is off. In example, if the microinverter is off, any load is detected, and the relay opens. Microinverters may be deactivated at night in solar systems, or whenever a generator is deactivated, thus any loads at these times (indicating a shared circuit) is immediately detected. However, some microinverters may also aid in detection of a non-dedicated circuit. If the relay is temporarily opened then shut, the power interruption causes the microinverter to shut down for a period of up to 5 minutes before it resumes operation. Between the time that the relay reconnects and microinverter restarts, if the circuit has an active shared load, it can be detected instantly by the disclosed AC diode. If a shared load was suspected during the sunlit hours, for example the AC diode's relay would be commanded to shut off momentarily thus allowing detection of any active shared loads. An AI program, such as those used by a home power monitor, can detect unidentified loads turning on and send a command for momentary relay disconnect that would cause detection of a shared load if it existed.

Additionally, certain appliances require dedicated circuits according to the NEC. However, none of these have the same risk of overcurrent as would a shared DER circuit. They are required to be dedicated for other reasons. In some examples, the AC diode does not detect a shared circuit where the circuit shares all loads. The AC diode can detect if a DER (power producer) circuit is shared with a load (power consumer). If one measures current at both ends of the circuit, a shared circuit can be detected anytime by comparing the single load or source current with the current at the breaker. If there is no match, the circuit is shared. As such, this is one example method that may be applied as described herein.

The inventors have recognized the above issues and have devised systems and methods to address them. In particular, methods and systems are provided according to the approaches described herein, such as the example claims and/or description.

In another embodiment, to address the issue of dedicated circuit detection, in one embodiment, a method comprises measuring the current at the circuit breaker located in the building's power distribution box, and comparing the breaker current with the current at the microinverter (or summed for multiple microinverters). These steps are performed by the solar monitor or equivalent. If the breaker current is equal to the microinverter current, it indicates a dedicated circuit; however, unequal current indicates that the circuit is shared. If a shared circuit is detected, the microinverter(s) is commanded to shut down electrical output and register a diagnostic condition. In this way, the system insures that the solar (photovoltaic) power generation circuit is indeed dedicated. When properly connected to a dedicated circuit, an over-current situation mitigates with the circuit breaker. The circuit breaker can limit the current by tripping (opening the circuit) if the current limit is exceeded.

In another embodiment, a shared circuit can be detected by monitoring the direction of the current at the circuit breaker. If the circuit ever sources any more than a small microinverter's nocturnal current, then the circuit is shared. This capability could be incorporated standardly into circuit breakers. A circuit breaker could be programed to trip not only if it current is above a threshold (e.g. 20 A) but it could be programmed to trip if the current was below zero (negative) amps. One would program the breaker to be either a sourcing breaker (for typical loads) or a sinking breaker (for DER). One could imagine the circuit breaker companies making a "solar breaker" that is color-coded to indicate additional or alternative functionality that trips if a load of more than 0.1 amps is drawn from it. This solar breaker could also have an integrated current sense circuit on it that transmits the DER's current in a number of possible ways.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
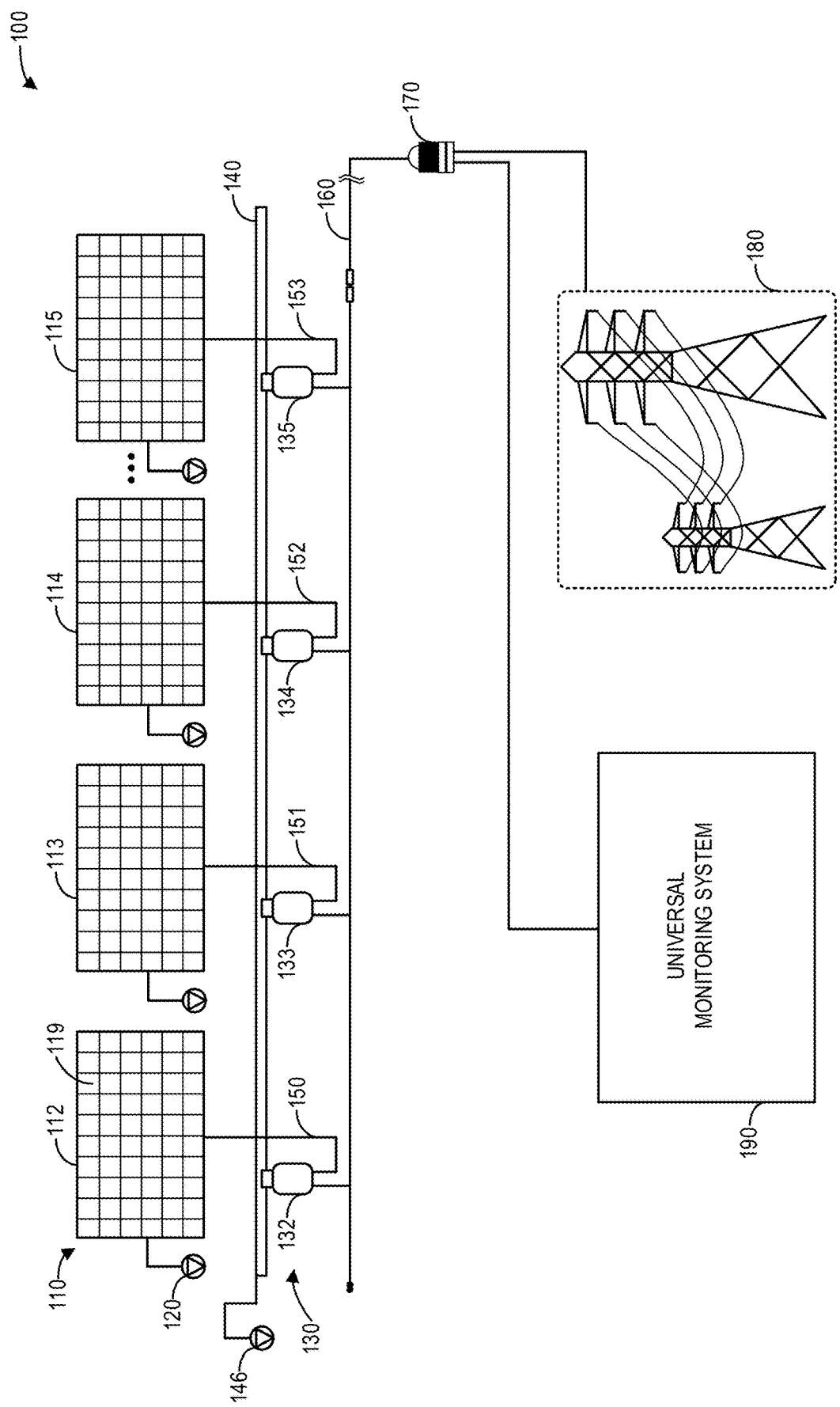
FIG. 1 shows an electrical system where each solar panel is connected with a microinverter, which communicates with the universal monitor.

The present disclosure also relates to systems and methods to detect an electrical current disagreement between circuit breaker current and microinverter current and command the microinverters to zero output if those do not match. Alternatively, the system can detect a circuit intended to accept current that is supplying current. An example electrical system is depicted in FIG. 1 with solar panels connected to microinverters that are, in turn, connected to a universal monitor may be used to monitor electricity production. The solar monitor may have a two-way communication with microinverters as well as with a cloud service through a network, as illustrated by the block diagram in FIG. 2. A method for this two-way communication, such as the method depicted in FIG. 3, includes the monitor recognizing microinverter ID number, assessing electricity production, and sending the output data to cloud service. An example environment for a microinverter monitoring system that connects via current transformers and voltage sense lines is illustrated by a monitor wiring diagram shown in FIG. 4. Additionally, a method for dedicated circuit detection, such as the method depicted in FIG. 5, includes microinverters measuring their individual AC current output, summing all reported microinverter currents for that circuit and comparing it with the circuit's current (which is measured by a current transformer or alternative means such as a current shunt), and thus remotely receiving command to either shut down or permit power production. The microinverter output depends on the detection of a shared versus non-shared circuit.

FIG. 1 illustrates an exemplary solar power generation system 100 configured for electricity production and power monitoring. The system consists of an array of solar panels 110 served by an array of microinverters 130. Specifically, each solar panel is served by one microinverter. For example, as depicted in FIG. 1, the panel 112 is connected to the microinverter 132 via the connection 150, the panel 113 is served by the microinverter 133 via the connection 151, the panel 114 is connected to the microinverter 134 via the connection 152, and the panel 115 is served by the microinverter 135 via the connection 153.

Each solar panel in the array has numerous cells 119 that are responsible for converting solar energy into electricity. Although, microinverters commonly serve panels containing sixty or seventy-two cells, there may be variations. In one example, two thirty-six cell panels may be connected in series to a single microinverter.

Multiple microinverters may be housed in a common case 140. For example, microinverters may be grouped into one, two, and/or four microinverters per case. However, the concept of one microinverter per panel remains the same. The main advantage of one Maximum Power Point Tracking (MPPT) per panel group is that they electrically isolate the panel group from each other, so small amounts of shading, debris or snow lines on any one solar panel group, or even a complete panel failure, does not disproportionately reduce the output of the entire array. (Of course the bypass (a.k.a. shading) diodes also contribute to this robustness, but in a different way.)

A microinverter is a plug-and-play device that converts direct current (DC power) generated by a single solar panel to alternating current (AC power) at a voltage level. In certain embodiments, 120, 208, and 240 VAC outputs are common. As depicted in the exemplary FIG. 1, each solar panel in the array 110 connects to individual microinverters in the array 130 via DC wires, typically with MC4-type connectors. The array of microinverters 130 is connected to a single AC interconnect cable 160. The output from several microinverters may be combined and often fed to the electrical grid 180. Optional cabling systems include "trunk cable" and "daisy chain". While they have important differences, they can be considered electrically equivalent following the approach herein since they both represent a parallel connection of AC power.

At present, grid-tie solar implementations are either strings of DC panels (panels in series all sharing a common current) or AC parallel known as a microinverter system which share a common voltage (e.g. 120 or 240 VAC). An MPPT-per-panel system in development is DC parallel and the subject invention can be applied to this as well. All grid-tie systems all eventually are converted to AC before they connect to the grid.

The solar system further includes a single monitoring system 190 that is connected to all the microinverters 130 present in the installation. In one example, this monitoring system 190 is a universal monitor, according to an embodiment of the present disclosure, which can recognize any make/model of microinverters. The universal monitor buffers the energy production data and optionally displays that data locally. For example, panel-level monitoring and configuration of microinverters may be provided via a monitoring PC or a smart phone or any other user friendly interface. Recent systems may be "monitor-less" in that they have no identifiable monitor. Instead the monitor is a software function inside other computational resources in communication with the microinverters (typically wireless).

In one embodiment, the array of microinverters 130 and the universal monitor 190 may share an electrical connection via separate voltage sense wires or its power plug 170. Over this connection, the power line communication (PLC) occurs. For example, perhaps once every 15 seconds the monitor may request data from a particular microinverter that may include instantaneous or average DC input voltage, DC input current, AC output voltage, AC output current, microinverter temperature, diagnostic states, etc. The microinverter listens to be addressed and responds with data and potentially its identifier.

In further embodiments, the universal monitor may function by issuing the microinverter a command to limit its power output. This may be implemented for remote shut-off where power is limited to zero or it may be for zero export where power is limited to not exceed consumption. In this case, the command to the microinverter may be issued more frequently, such as twice per second.

Figure 2:
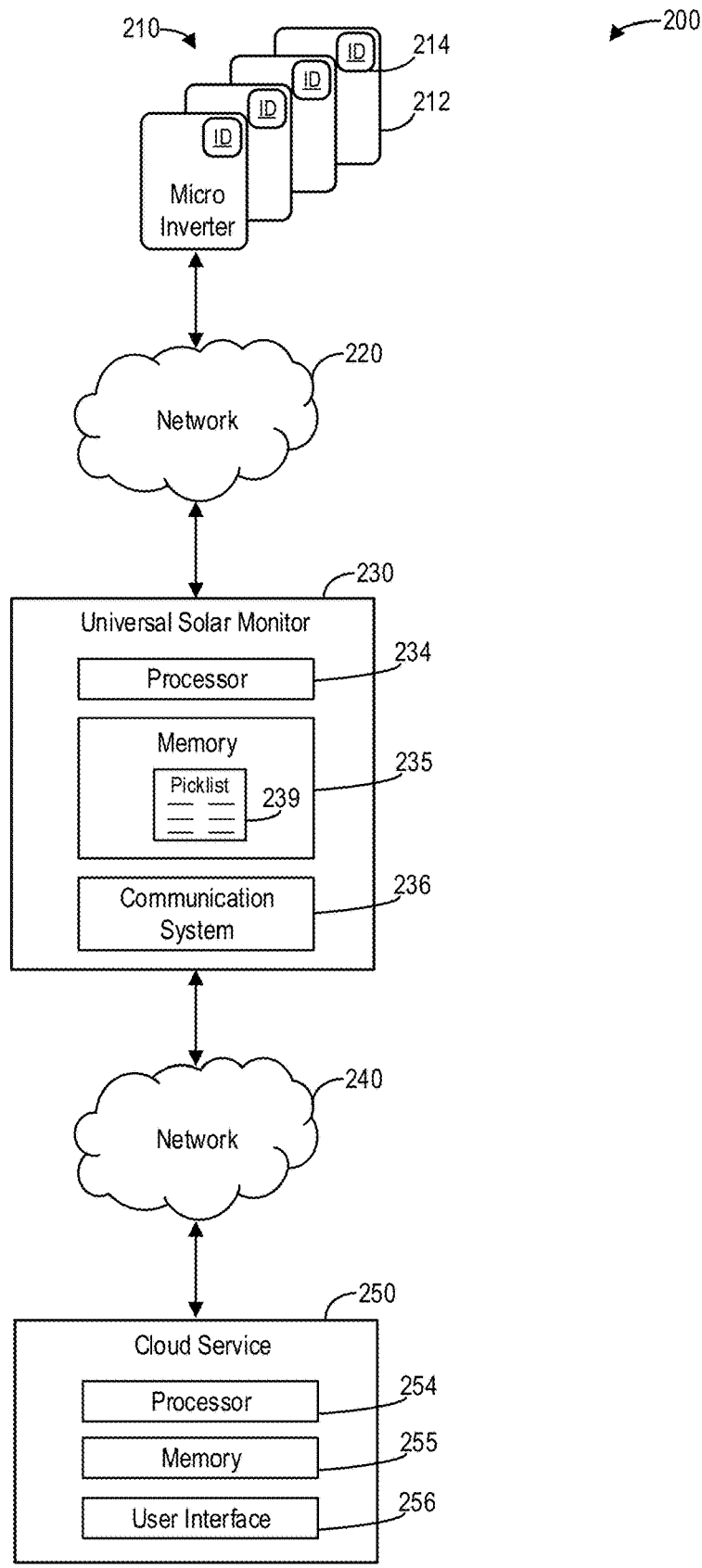
FIG. 2 illustrates an overview of an exemplary computing environment according to an embodiment.

FIG. 2 illustrates an overview of an exemplary computing environment 200 according to an embodiment of the present disclosure. The computing environment 200 includes a universal solar monitor 230, at least one cloud service 250 communicatively coupled to the universal monitor 230 via a network 240, and a plurality of microinverters 210 also communicatively coupled to the universal monitor 230 via a network 220. However, not all of the components illustrated may be required to practice the invention. Further, variations in the arrangement and the type of the components may be made without departing from the spirit or scope of the invention.

In one example, monitor 230 may be a stand-alone box configured to analyze relevant parameters and using the extracted information to identify problems, develop solutions and/or present system recommendations. The monitor may be configured to provide microinverter-by-microinverter diagnostics and panel-by-panel production of the solar power system. In certain other embodiments, monitor 230 may take the form of a software product incorporated into a mainframe computer, a server computer, a desktop computer, a laptop computer, a tablet computer, a network computing device, a mobile computing device, or any other device. Hence, this monitoring interface may replace the existing microinverter monitor or it may simply be included in home power monitoring products offered by other entities.

Solar monitor 230 comprises a logic subsystem such as a processor 234, a data-holding subsystem such as a memory 235, and a communication subsystem 236. The monitor 230 may optionally include a display subsystem, a user interface subsystem, and other components not shown in FIG. 2. The processor 234 comprises one or more physical devices configured to execute one or more instructions. For example, processor 234 may execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor 234 may thus include one or more processors configured to execute software instructions. Additionally or alternatively, the processor 234 may comprise one or more hardware or firmware logic machines configured to execute hardware or firmware instructions. Processor 234 may be single or multi-core, and the programs executed thereon may be configured for parallel or distributed processing. The processor 234 may optionally include individual components that are distributed throughout two or more devices, which may be remotely located.

Memory 235 of the universal monitor 230 may comprise one or more physical, non-transitory devices configured to hold data and/or instructions executable by the processor 234 to implement the methods and processes described herein. When such methods and processes are implemented, the state of the memory 235 may be transformed (for example, to hold different data).

Memory 235 may include removable media and/or built-in devices. Memory 235 may include optical memory (for example, CD, DVD, HD-DVD, Blu-Ray Disc, etc.), and/or magnetic memory devices (e.g., hard drive disk, floppy disk drive, tape drive, MRAM, etc.), and the like. Memory 235 may include devices with one or more of the following characteristics: volatile, non-volatile, dynamic, static, read/write, read-only, random access, sequential access, location addressable, file addressable, and content addressable. In some embodiments, the processor 234 and the memory 235 may be integrated into one or more common devices, such as an application-specific integrated circuit or a system on a chip.

In one embodiment, the memory 235 of the universal monitor 230 may include a built-in library or a picklist 239 comprising microinverter serial numbers, make/model, and all communication protocols for each microinverter. This library/picklist 239 may be inputted into the memory 235 of the monitor 230 via barcode scanner or may be transmitted wirelessly or by any other means. The picklist 239 is updatable with new information whenever needed. Via a communication system 236, the universal monitor 230 may analyze a plurality of microinverters 210, as described herein, to identify each of them for initiating further communication. Each microinverter 212 may include its own serial ID number 214 that serves as a device identifier which is evaluated by the universal monitor 230 against its own library or picklist 239 built into its memory 235. The universal monitor attempts all known communication structures until the best response is received from the microinverters. The results of the analysis may be stored locally, for example, in a data store (not shown) of the memory 235.

In some examples, the computing environment 200 further comprises a cloud service 250. The cloud service 250 may comprise any suitable computing device configured to access a network such as network 240, including but not limited to a personal desktop computer, a laptop computer, a smartphone, a tablet computer, and the like. While one cloud service 250 is shown, it should be appreciated that any number of cloud services operated by respective users may be communicatively coupled to the universal monitor 230 via the network 240.

The cloud service 250 may comprise a processor 254, a memory 255, and a user interface 256. The cloud service 250 may optionally include a display subsystem, and other components not shown in FIG. 2. Similar to the processor 234 of the universal monitor 230, the processor 254 of the cloud service may include one or more processors configured to execute software instructions. Further, the memory 255 of the cloud service 250 may include one or more physical, non-transitory devices configured to hold data and/or instructions executable by the processor 254 to implement the methods and processes described herein. Further, in some examples, the output data from the solar system may be stored in the memory 255.

The user interface 256 of the cloud service 250 may comprise one or more user input devices such as keyboards, mice, game controllers, cameras, microphones, touch screens, and so on. A user of the cloud service 250 may input requests or commands, for example, via the user interface 256 for microinverter output analysis, which may be transmitted to the monitor 230 via the network 240.

Thus, the monitor 230 and the cloud service 250 may each represent computing devices which may generally include any device that is configured to perform computation and that is capable of sending and receiving data communications by way of one or more wired and/or wireless communication interfaces. Such devices may be configured to communicate using any of a variety of network protocols. For example, cloud service 250 may be configured to execute a browser application that employs HTTP to request output data from universal monitor 230 and then display retrieved information to a user on a display (not shown). A connected device such as a PC, tablet, or smart phone could display solar individual panel and array data from the cloud. It could also command the microinverter if that messaging capability is built into the microinverter.

In one embodiment of the present disclosure, all microinverter monitors are cloud connected, e.g., wirelessly. This cloud connection allows Over the Air (OTA) updates to the monitoring system software as the number of supported historic and current microinverters grow. Microinverters report out to a cloud reporting system. For example, the universal monitor according to the present disclosure sends the microinverter production and diagnostic data to its own independent cloud service, which may be a contracted service. This cloud service may provide an internet browser-based and smart-phone app-based interface to a given installation's solar production and diagnostic data. Therefore, disassociating the cloud service that tracks production/diagnostics from the microinverter manufacturer further frees the installer to make a lowest cost choice on microinverter brand. This eliminates the concern of company viability for the microinverter manufacturer, thereby allowing the installer to choose less costly product choices.

Figure 3:
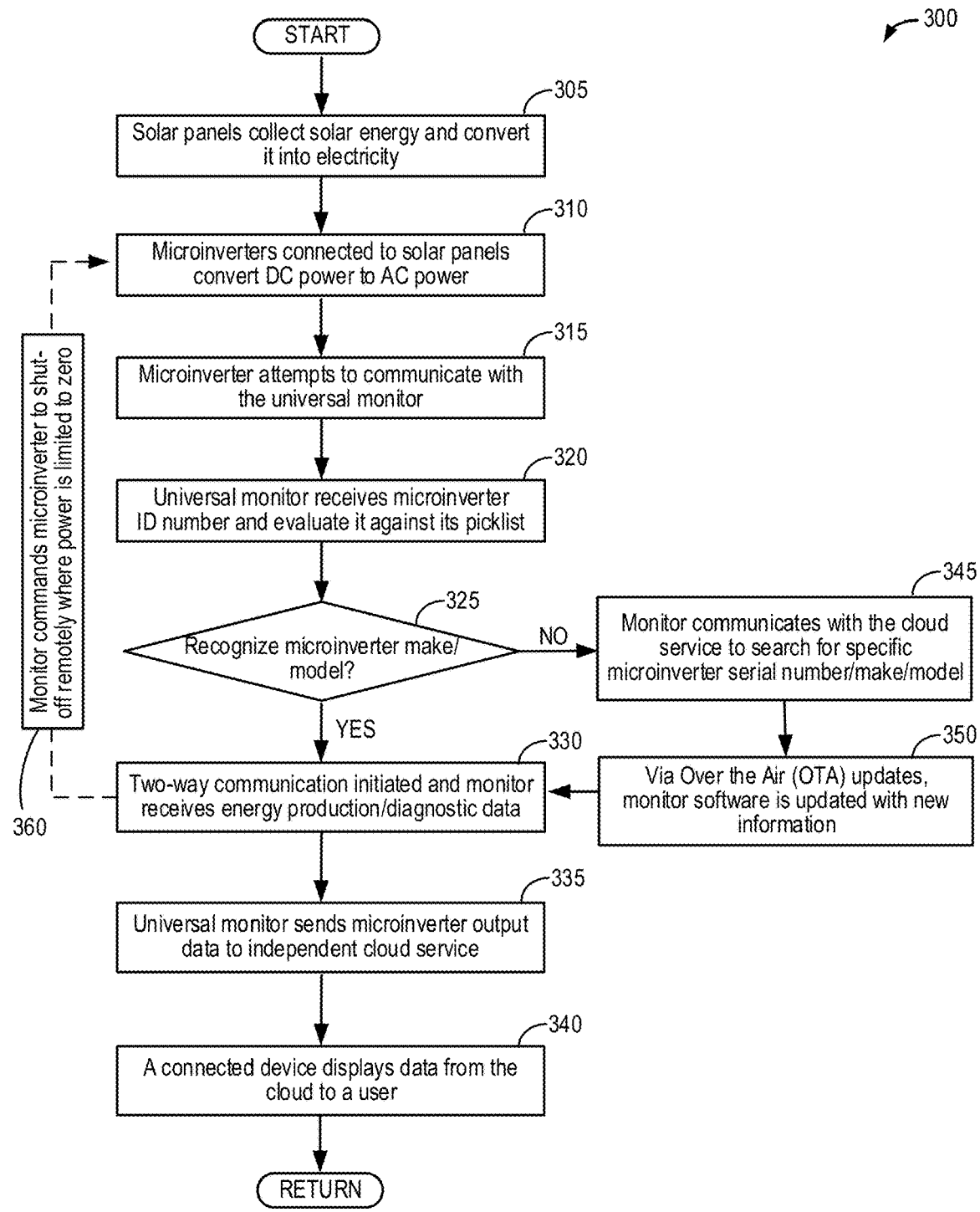
FIG. 3 shows a high-level flowchart of an example method of communication between microinverter, universal monitor, and cloud service.

FIG. 3 shows a high-level flow chart illustrating an example method 300 for communication between microinverters, universal solar monitor and cloud service according to an embodiment of the present disclosure. Method 300 is described with regard to the systems and components of FIGS. 1 and 2, though it should be appreciated that the method 300 may be implemented with other systems and components without departing from the scope of the present disclosure.

Method 300 begins at 305. At 305, the solar panels collect solar energy and convert it into electricity. Any type of solar panels may be used. For example, 36-cell panel, 60-cell pane, 72-cell panel, and so on. At 310, microinverters connected to each solar panel of the array convert DC power to AC power. Any make or model of the microinverter may be used for this function. Alternatively, microinverters connected to each solar panel may not be from the same manufacturer.

At 315, the method includes microinverter attempting communication with the universal solar monitor. (It may be more conventional for the monitor to ask the microinverter to transmit.) The communication may take place either through a wireless network or through a wired connection.

At 320, the universal solar monitor receives the serial ID number of a microinverter and begins evaluating it against its own built-in library. This step is performed in order to search and recognize the specific communication protocol that can be set up with that particular microinverter. The universal monitor may be configured to perform this step with each microinverter in the solar array either separately or at the same time. Knowing this, the monitor would immediately know the communication (two-way) language. In one example, one could pick an unknown microinverter and the universal monitor would try all known communication structures to check for compatibility.

At 325, it is determined if the make/model/serial ID of a microinverter is recognized by the universal monitor. If the microinverter is recognized ("YES"), method 300 continues to 330. At 330, the method initiates a two-way communication between the microinverter and the universal monitor. As a result, the monitor begins receiving energy production and diagnostics data from the recognized microinverter. Further, the monitor may issue the microinverter a command to limit its power output at step 360. In one example, it may be for remote shut-off where power is limited to zero. In another example, it may be for zero export where power in limited to not exceed consumption.

At 325, if the microinverter is not recognized by the universal monitor ("NO"), method 300 continues to 345. At 345, the universal monitor communicates with the cloud service to search for the specific microinverter serial ID/make/model in the common web service of the independent cloud. At 350, the cloud connection allows Over the Air (OTA) updates to the monitor software as the number of historic and current microinverters grow. This OTA update is triggered in a number of ways including being triggered manually or "pushed". After updating the monitor with the new serial ID number, the previously unrecognized microinverter now gets recognized by the universal monitor and the method 300 returns to 330. As a result, communication and data exchange between the monitor and microinverter begins as previously described in the disclosure.

At 335, the universal monitor sends microinverter output data and energy production information to the independent cloud service. The cloud service may be flexibly configured. For example, when the universal monitor according to an embodiment of the present disclosure is housed in an aligned product such as a power consumption monitor, the microinverter data would be sent to a common web service associated with that product. At 340, a connected device such as a PC, tablet, or smart phone may display solar individual panel and array data from the cloud to a user.

Figure 4:
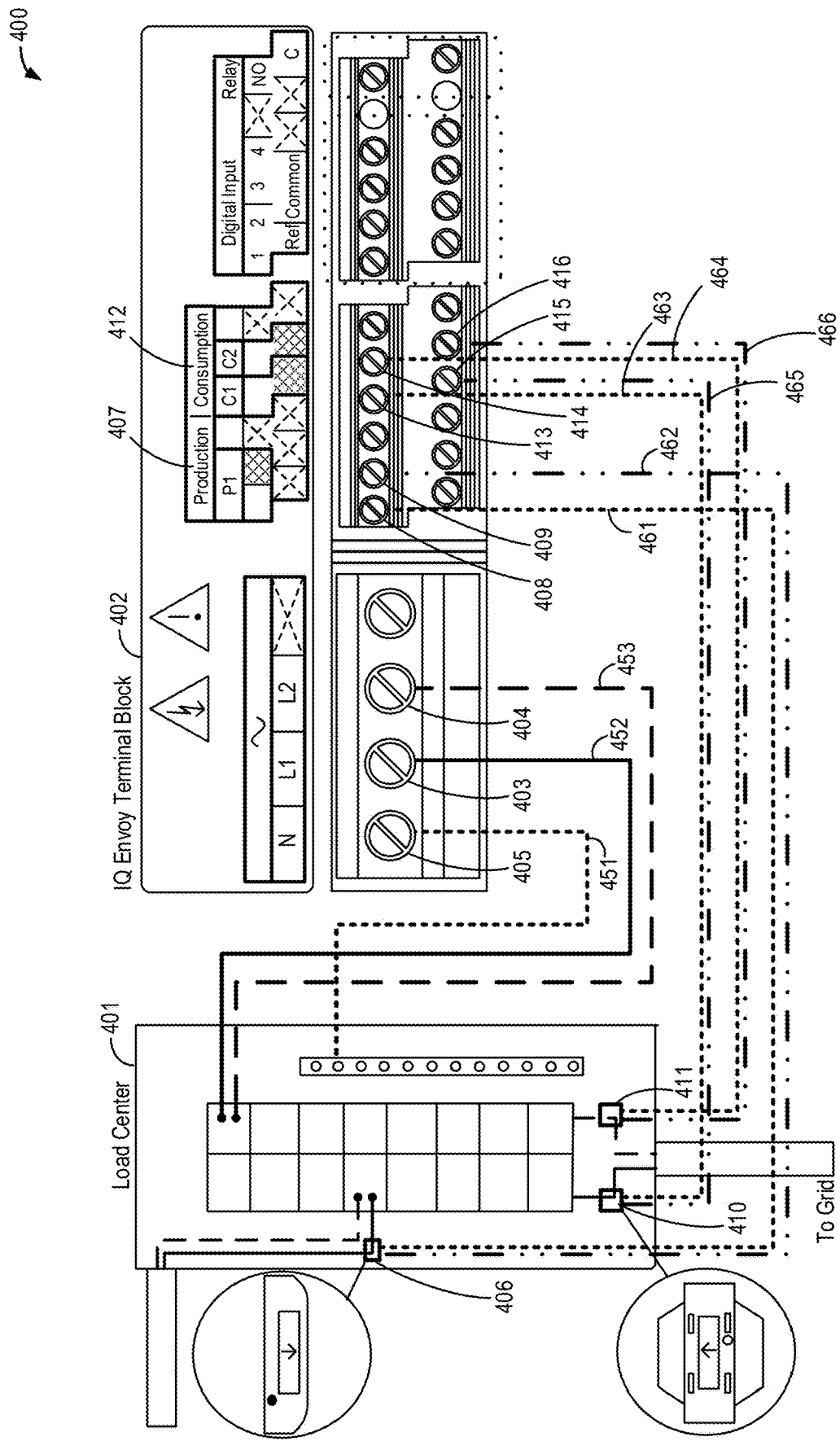
FIG. 4 shows an example environment for a microinverter monitoring system including current transformer and voltage connection.

FIG. 4 illustrates an example environment 400 for a microinverter monitoring system including current transformer and voltage connection. A considerable cost efficiency is gained by housing the microinverter monitor function in a power monitoring product or home automation box since it typically has the same connectivity as a microinverter monitor, i.e. current transformers on supply or solar wires, voltage connection, wireless connection that eventually yields cloud connectivity.

The photovoltaic or solar system is connected to a Load Center panel (LCP) 401, which is a metal electrical service box that distributes current to the various home circuits. The LCP contains one or two pole circuit breakers which form a point at which to measure the relevant AC voltages. The monitor uses a terminal block (TB) 402 for power and meter connections. In order to keep the phase consistent from LCP to TB, the wire Line 452 is connected to the L1 point 403 in the TB and the Line 453 is connected to the L2 point 404 in the TB, and neutral wire 451 is connected to the N point (405) in the TB.

The supply current transformer (CT) 406 is needed for the production metering. The CT wires are first connected in the production panel section 407 of the TB before physically installing the CTs around the circuit wire. At the TB the white production CT wire 461 is connected from the LCP to the left P1 terminal 408. The blue production CT wire 462 is connected from the LCP to the right P1 terminal 409. The CT arrow should be pointing towards the load and away from the solar array.

Consumption metering requires the installation of two split core CTs 410, 411. The CT wires are connected from the LCP to the consumption section 412 of the TB. For each of the two CTs, the wires 463 and 464 are connected to the left PC1 terminal and the left PC2 terminal, respectively. The wires 465 and 466 of each of the two CTs are connected to the right PC1 terminal and the right PC2 terminal, respectively. The CT arrows should be pointing away from the load and towards the solar array.

Figure 5:
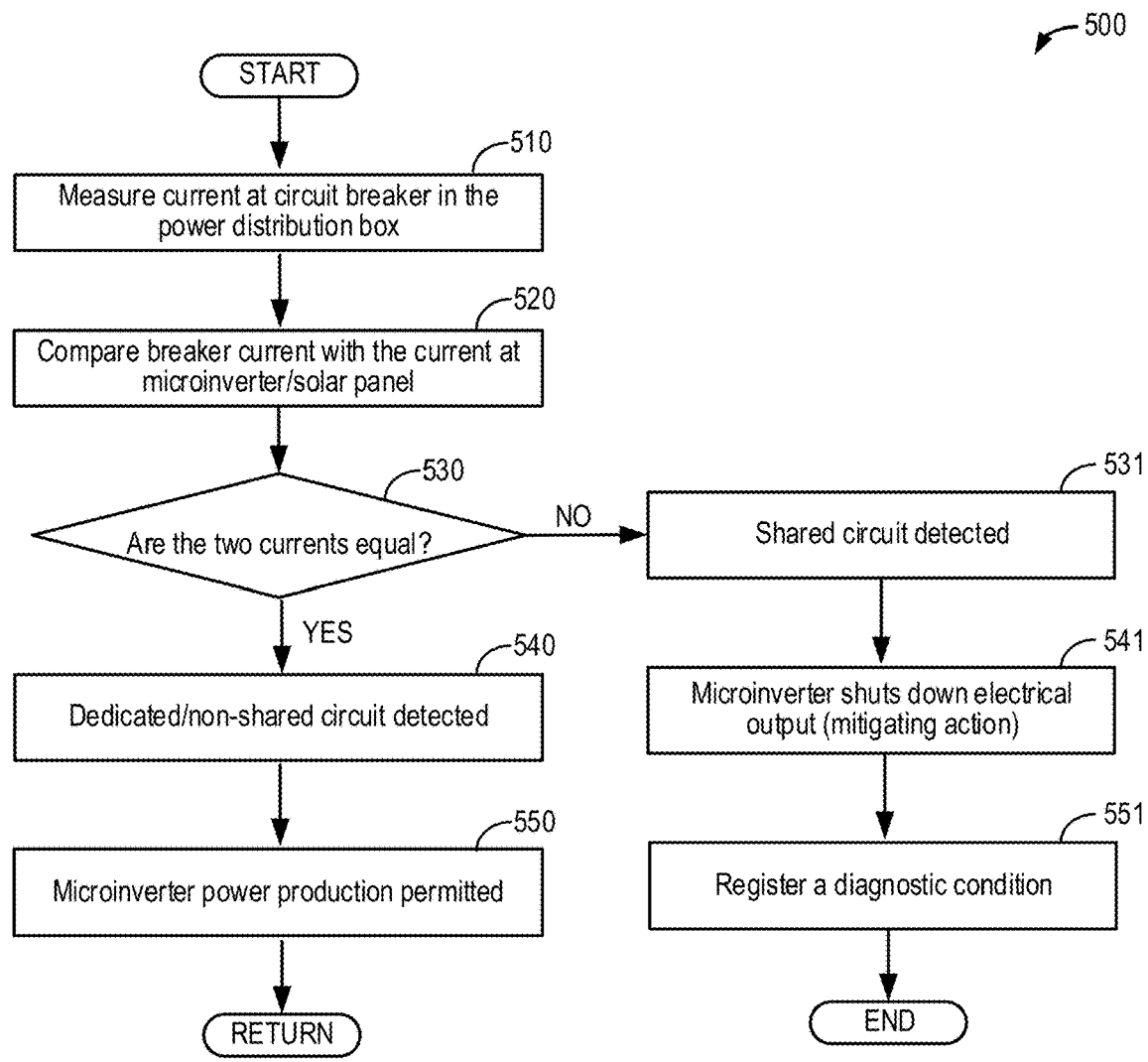
FIG. 5 shows a high-level flowchart of an example method for dedicated circuit detection.

FIG. 5 shows a high-level flowchart of an example method 500 for dedicated circuit detection, according to one embodiment of the present disclosure. Microinverters are set up well for performing the function of non-shared circuit verification. All microinverters control power/current out of the box. They all enforce a strict power limit (which may actually be a current limit), clipping the power above a rated level. In some examples, they have a peak and a steady state level. Additionally or alternatively, all microinverters cause power production to go to zero if they detect they are no longer attached to the grid (or the grid is out-of-spec). Further helping the cause is that all microinverters have communication via Power Line Communication (PLC), wireless, or Zigbee™. This allows a microinverter to receive data remotely from a device that transmits either the circuit breaker current or a command to shut down/permit microinverter power production.

Each microinverter is connected to one solar panel (or multiple solar panels). Microinverters (which may be packaged singly, doubly, or quadruply) daisy chain together to feed a single circuit. A microinverter monitor receives reports from the microinverter as to the current produced. The unusual thing is the circuit's current is measured at the breaker and that data arrives at the microinverter monitor. In this way, the microinverter monitor has knowledge of both the current sourced by the microinverter(s) and the current at its circuit breaker. Should these currents disagree; the microinverter monitor commands the microinverters to zero output and displays a diagnostic message.

The idea here is the same box needs knowledge of both currents to determine if they match. It makes sense for the box to be the microinverter monitor because it both receives the instantaneous microinverter currents (from each microinverter) and can command the microinverter normal mode to zero output.

The communication between microinverter and microinverter monitor may take the form of PLC, wireless, etc. The communication between microinverter monitor and the circuit breaker current sensor is likely hardwired but may take the form of PLC, wireless, etc.

Method 500 for dedicated circuited detection performed by the universal monitor, as laid out in FIG. 5, begins at 510. At 510, the universal monitor measures the current at the circuit breaker located in the building's power distribution box.

At 520, the universal monitor compares the circuit breaker current with the current at the microinverter/solar panel.

At 530, it is determined whether or not the circuit breaker current is equal to the microinverter current. If the two currents are equal ("YES"), method 500 continues to 540. At 540, a dedicated or non-shared circuit is detected. In this way, it is insured that the solar (photovoltaic) power generation circuit is indeed dedicated.

At 550, the microinverter power production is permitted by the monitor due to the detection of a dedicated circuit. In one example, when the solar power system is properly connected to a dedicated circuit, an over-current situation mitigates with the circuit breaker. Thus, the circuit breaker will limit the current by tripping (opening the circuit) if the current limit is exceeded.

At 530, if the circuit breaker current is not equal to the microinverter current ("NO"), method 500 continues to 560. At 560, a shared circuit is detected. Consequently, at 570, the microinverter is commanded by the monitor to shut down electrical output due to the detection of a shared circuit. At 580, a diagnostic condition is registered. In one example, when the solar power system is improperly connected to a shared circuit, this is detectable and will be mitigated via the microinverter receiving a command to cease output. A diagnostic message will notify the user that the circuit is not dedicated as it is required to be.

Those having skill in the art will appreciate that there are various logic implementations by which processes and/or systems described herein can be affected (e.g., software), and that the preferred vehicle will vary with the context in which the processes are deployed. "Software" refers to logic that may be readily readapted to different purposes (e.g. read/write volatile or nonvolatile memory or media). The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Not shown in 500 is the reset method that will be needed once the wiring error (shared versus dedicated) is corrected.

In addition, a "source-only" breaker may be provided in a wirelessly-connected-DER device. This device is a way to tie into a building's power, on the metered side, that does not involve the power distribution panel or is in addition to the power distribution panel connection/interface.

Figure 6:
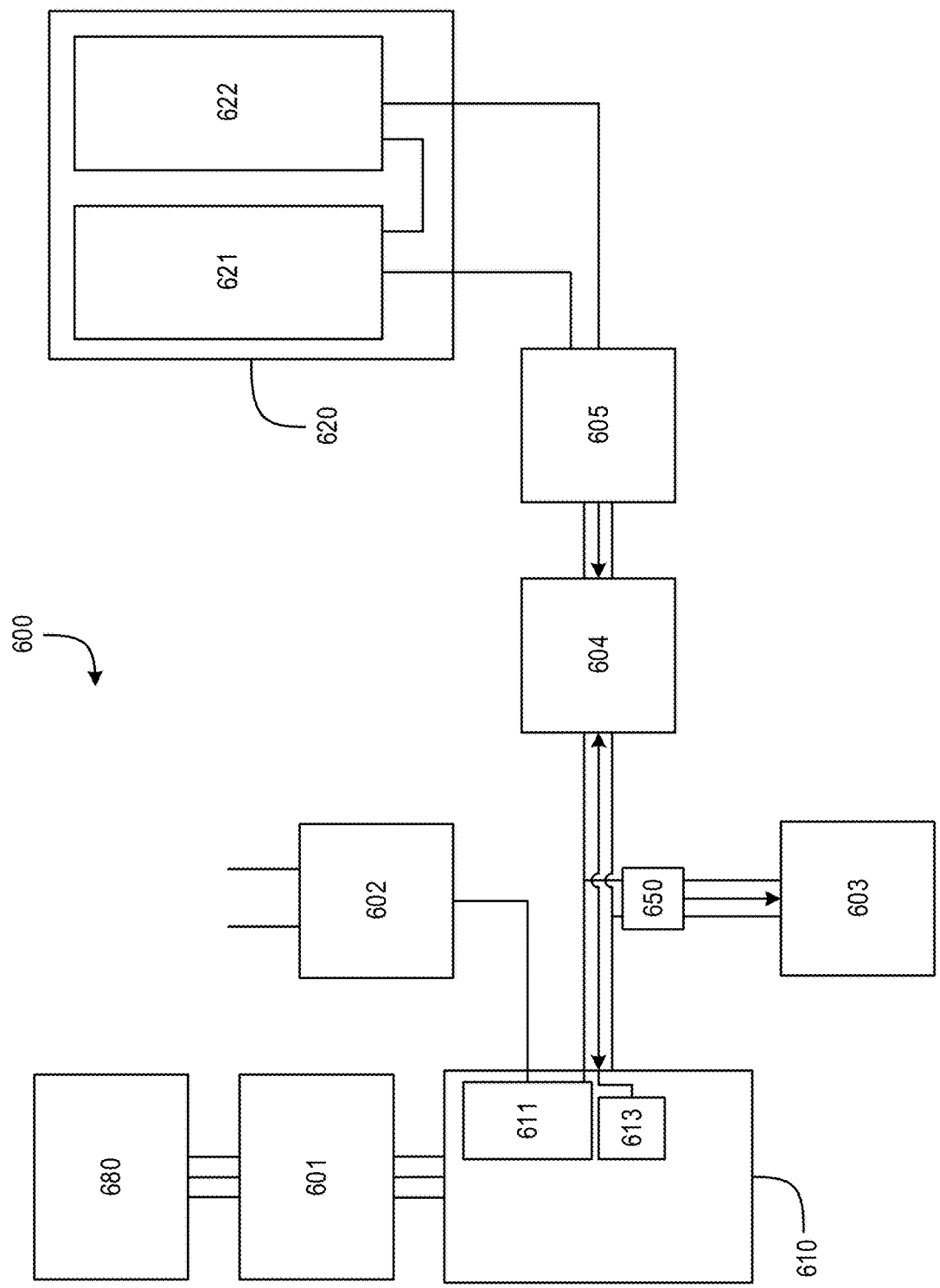
FIG. 6 shows an example block diagram to illustrate the potential problem of backfeeding and how this problem may be resolved through the use of a current transformer.

FIG. 6 shows an example block diagram of an electrical system 600 wherein the solar array 620 (with solar panels 621 and 622) is connected to a microinverter 605. The microinverter is plugged into a wall outlet 604. The circuit is intended to be dedicated to go from the solar panels (or other power generating devices such as generators, storage batteries, etc.) 620 to the microinverter 604 and backfeed to the circuit breaker 610. Circuit breaker 610 contains a current transformer 611 connected to the power lead to the circuit. The circuit breaker also contains a neutral lead 613. The circuit breaker is further connected to a power meter 601 and the electrical grid 680. Positive current flows into the circuit breaker through the current transformer to the reverse current detector 602.

Suppose the microinverter(s) 605 are producing, for demonstration in this scenario, 16 amperes. As an illustration of the primary issue, a current-drawing component 603, that may be plugged into a wall outlet via a plug at 650 is presented that may be plugged in a by an occupant (e.g., a hair dryer or electric heater), drawing, in this scenario, 26 amperes. Since the circuit breaker 610 in this scenario only detects a net current of 10 A (16 A input from solar panels 105 less 26 A from the current drawing component 103), it does not trip. However, the branch circuit to component 603 is carrying 26 amperes on wire that could be, for example, rated at a maximum current of 20 amperes. This is the scenario that the dedicated circuit requirement attempts to prevent. The invention augments that electrical code requirement with detection and/or mitigation.

An advantage in some examples is that the system needs only detect the direction of the current and not the magnitude. As explained herein, current detection is readily detectable by thresholding the level produced by a current transformer 611 and having a connection to power (either 120 or 240 volts AC). It is the phase between the current and voltage that determines the current direction. A typical breaker should only source power to the circuit. A back fed breaker should only sink power from the circuit. Should it ever source power, the circuit is not dedicated and thus is not code compliant. The subject application uses hardware and/or software to optionally detect and optionally enforce what is now only enforced via regulatory code.

Figure 7:
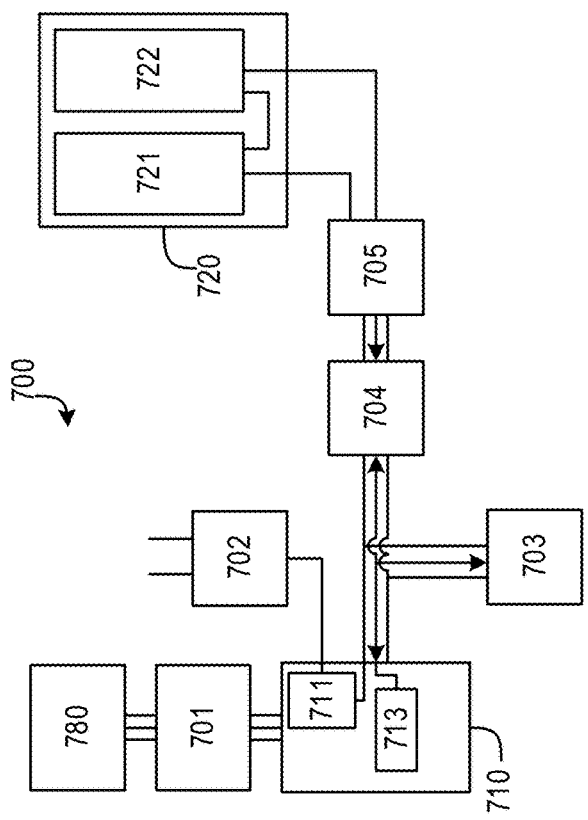
FIG. 7 shows example block diagrams of several embodiments of the current transformer solution.
Figure 7:
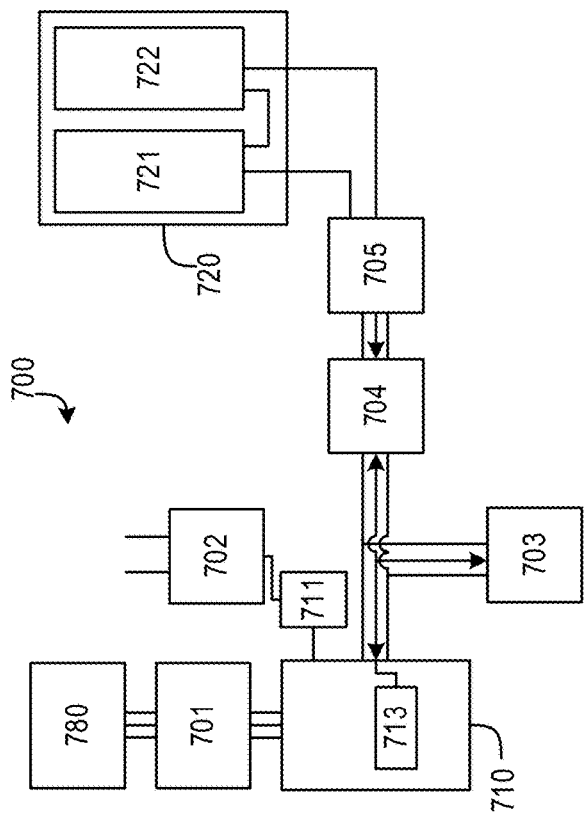
Figure 7:
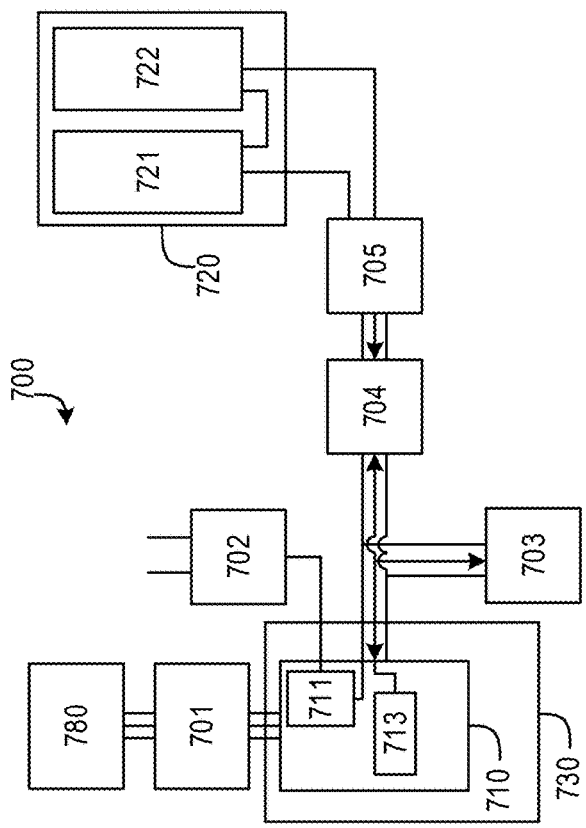

FIG. 7 presents several example block diagrams of embodiments of the circuit configuration presented in FIG. 6. In this figure, solar array 720 (with solar panels 721 and 722) directs power to microinverter 705, which is plugged into wall outlet 704 to transfer current to the circuit breaker 710. Circuit breaker 710 contains a power lead and a neutral lead 713. The circuit breaker 710 is connected to a reverse current detector 702. A branch circuit leads to other current-drawing devices connected to the circuit at 703. The system is further connected to a power meter 701 and the electrical grid at 780. In one embodiment, shown as 700, the current transformer 711 could be a standalone device which connects to the circuit breaker 710 and the reverse current detector 702.

In another embodiment 701, the current transformer 711 could be implemented within the circuit breaker itself. In this embodiment, as above, solar array 720 (with solar panels 721 and 722) directs power to microinverter 705, which is plugged into wall outlet 704 to transfer current to the circuit breaker 710. Circuit breaker 710 contains a power lead and a neutral lead 713. The circuit breaker 710 is connected to a reverse current detector 702. A branch circuit leads to other current-drawing devices connected to the circuit at 703. The system is further connected to a power meter 701 and the electrical grid at 780. The circuit breaker 710 would be instrumented and programmed to trip if it sourced current to a power consumer. Since the microinverter 705 typically has a nighttime draw of approximately 2 watts, a diminutive amount of load current would be permitted before trip.

In a third embodiment 702, circuit breaker 710 with the current transformer 711 can also be implemented within a home power monitor 730 with brands including, but not limited to, Sense, Emporia Vue, Eyedro™, Efergy™, and Shelby EM. In this embodiment, as above, solar array 720 (with solar panels 721 and 722) directs power to microinverter 705, which is plugged into wall outlet 704 to transfer current to the circuit breaker 710. Circuit breaker 710 contains a power lead and a neutral lead 713. The circuit breaker 710 is connected to a reverse current detector 702. A branch circuit leads to other current-drawing devices connected to the circuit at 703. The system is further connected to a power meter 701 and the electrical grid at 780. Note that most of these solutions already have a current transformer on the solar (DER) circuit and sense voltage at the power distribution panel, thus implementing the detection of outflowing current would not need additional inputs and thus may be a software only upgrade.

An additional or optional feature may include breakers that are sensitive to the direction of current. Load breakers may allow current to power various devices. DER breakers allow current to come in from sources. There are regulations about adding these back fed breakers to power distribution boxes. First, back fed breakers limit the total amperage of the backfed breakers to 25% of the power distribution panel. Additionally, in certain cases, the backfed breakers restrict the positioning to minimize the possible maximum current in the bus bars. However, these rules all stem from using standard breaker boxes with back fed circuits. Newer breaker boxes (i.e., power distribution panels) have features in them that limit the quantity of piggy back breakers that can be installed in them. Similar features can be used for breakers that would enforce a dedicated back fed circuit breaker. Thus, one might allow only two breaker spaces for a backfed breaker. This would allow four 20 A 120 VAC circuits or two 20 A 240 VAC breaker in a 200 A power distribution box. Of course, if the breaker box was designed for higher levels of back fed circuits, that DER breaker spaces could be increased.

Figure 8:
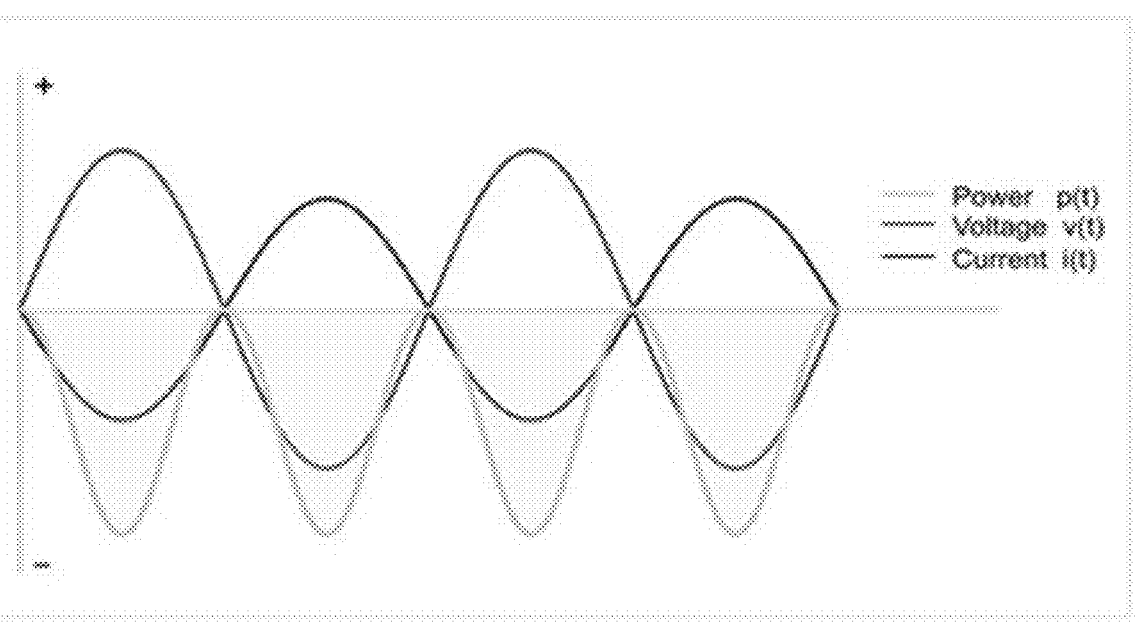
FIG. 8 shows two graphs of power, voltage, and current over time.
Figure 8:
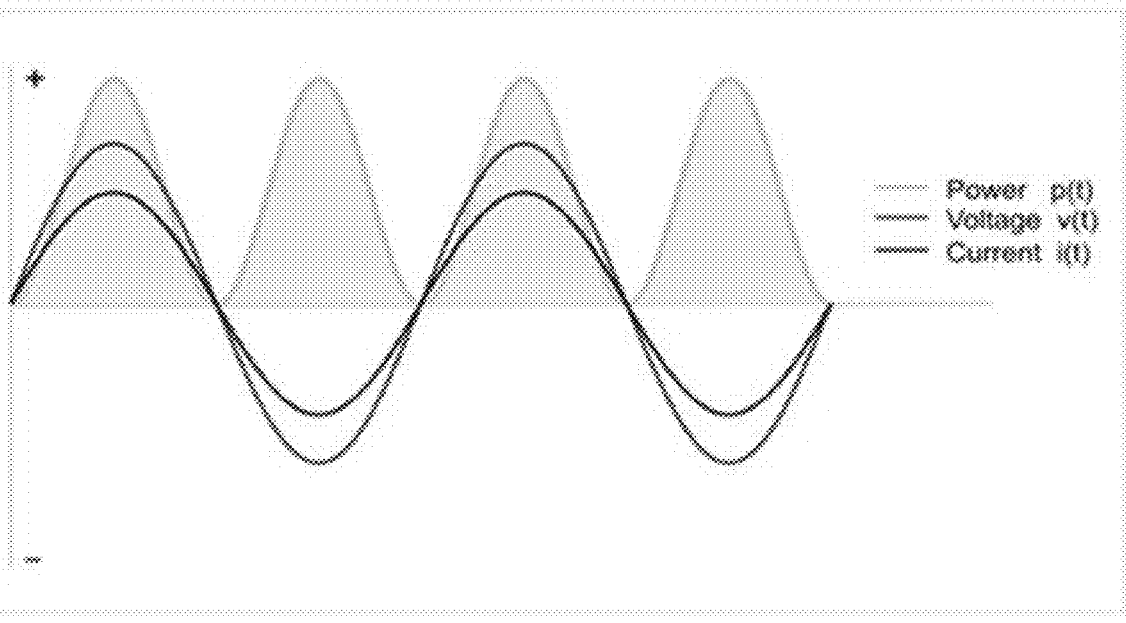

FIG. 8 shows two graphs of power, voltage, and current over time. In diagram 800, the current and voltage are out of phase when the circuit breaker is accepting current from the circuit. This represents normal behavior for a solar inverter. However, in diagram 801, the current and voltage are in phase when the circuit breaker is sourcing current to the circuit. This constitutes a fault for a circuit breaker connected to a solar inverter.

Diagrams 800 and 801 show voltage and current alternating between positive and negative. However, power is either positive or negative. Both literal and AC diodes allow current flow in at least one direction; however, the AC diode allows power flow in only one direction. While not literally true, it is reasonable to speak of AC current flow direction. It is to be understood that with AC circuits there is no net current flow, but it aids understanding to use DC concepts to express AC workings. Thus, in some examples, the AC diode prevents reverse current in this sense. In a complete literal sense, it allows power flow only in one direction, DER to grid (if used in this way).

With reference to FIG. 8, one sees that an out of phase current and voltage result in the negative power. This is indicative of power flowing from the DER to the grid. In diagram 801 one can see that an in-phase current and voltage result in the positive power. This is indicative of power flowing from the grid to a load. What is referred to as an AC diode is not a literal diode but a device that monitors the sign of the power and take action to stop/prevent either negative or positive power. In one mode, it prevents positive power above 2 watts. This means it only allows significant power flow from the DER (e.g. solar panel inverter, or battery and inverter) to the grid.

In an embodiment where the DER is a battery, the AC diode is only active when the battery and its inverter are supplying the grid. When the battery is being charged, positive power is allowed. In the case of positive power detection, the circuit breaks. This can be the single circuit breaker on that circuit, or an additional device wired in series with the standard circuit breaker that adds this function. A circuit breaker is, in essence, a relay that open for whatever fault condition is detected. The fault condition this invention detects is the sign of power. Alternately, the fault detected is a mismatch of DER current and circuit breaker current. The AC diode is implemented as a fault detection device and a method to break the circuit.

Figure 9:
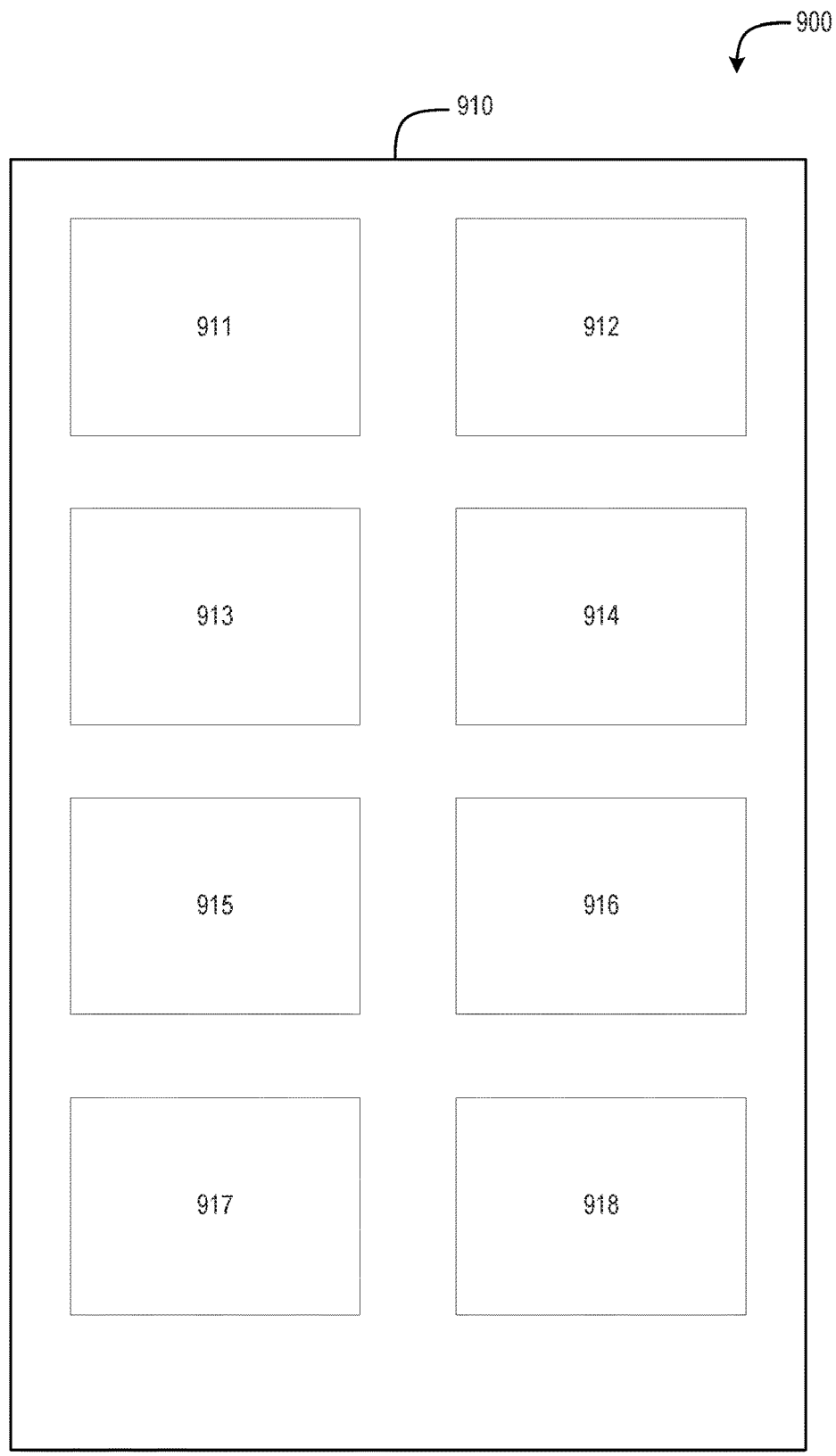
FIG. 9 presents an example block diagram of a Smart ConnectDER system.

FIG. 9 presents an example block diagram 900 of a Smart ConnectDER system 910. In this diagram, the components of the system are a DER meter 911, a whole house meter 912, an Ethernet bridge 913, a communications module 914, a DER relay 915, a circuit breaker 916, a terminal block 917, and an A/C diode 918. For the purpose of the invention disclosed herein, the circuit breaker 916 could be replaced with the circuit breaker described in FIG. 6 and FIG. 7 for the purpose of preventing the scenario shown in FIG. 6 and FIG. 8.

Figure 10:
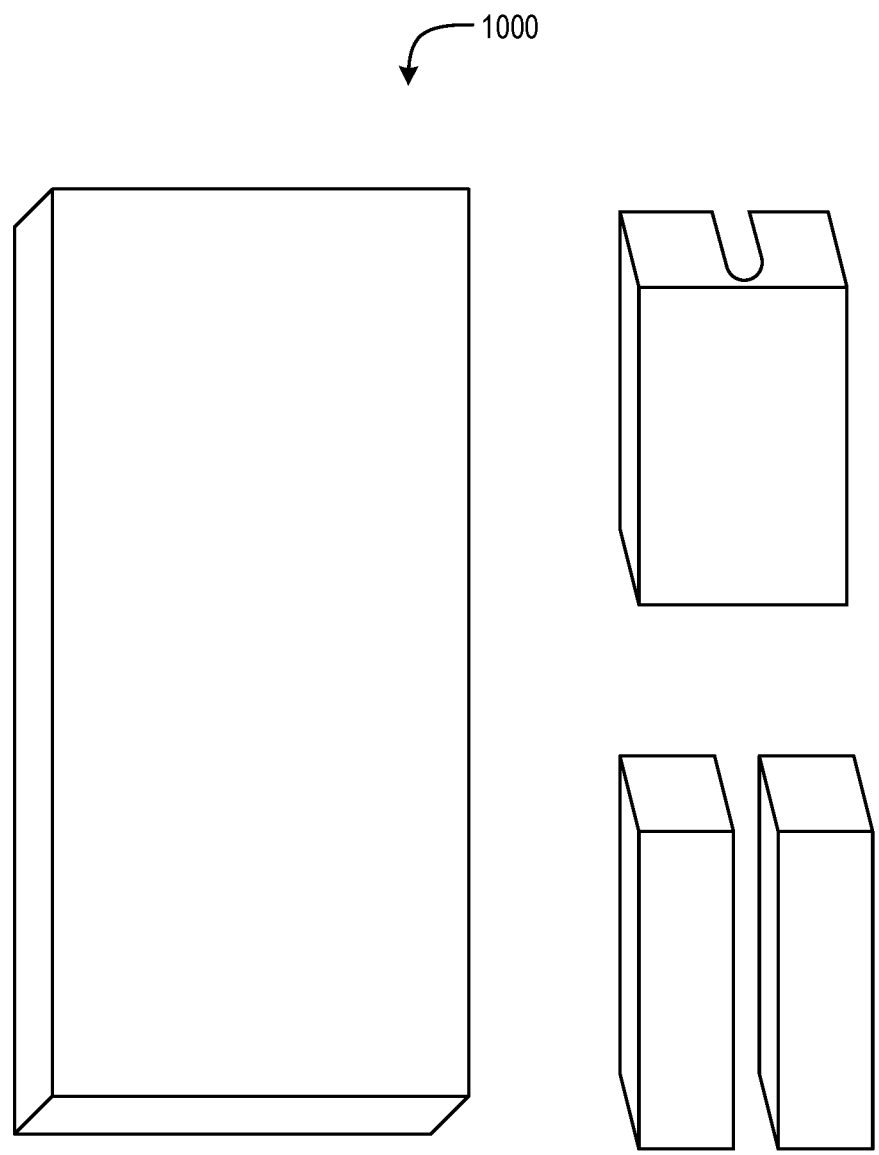
FIG. 10 presents an example image of a home circuit breaker panel.

FIG. 10 presents an example image of a home circuit breaker panel.

Figure 11:
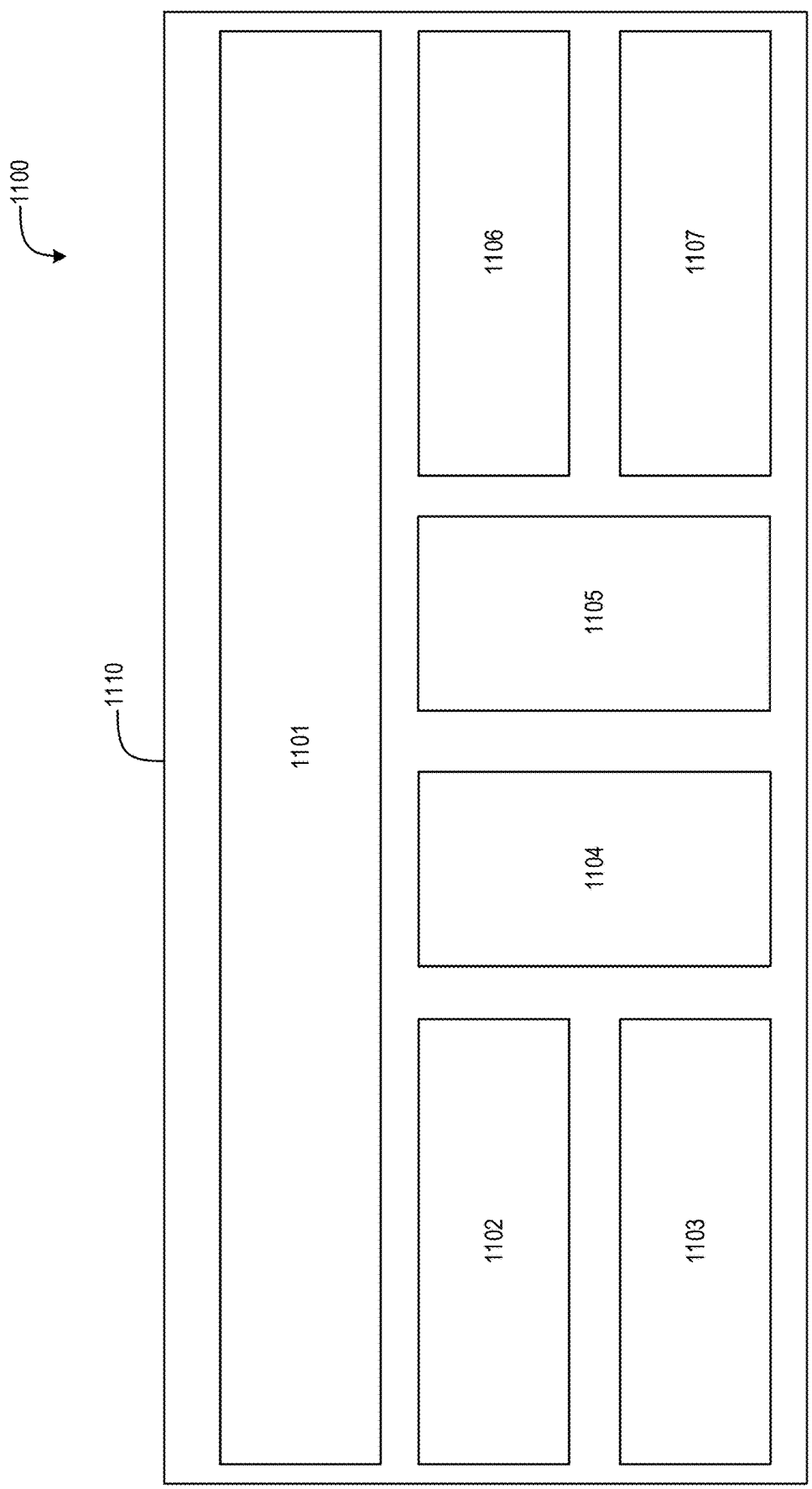
FIG. 11 presents an example block diagram of a circuit block.

FIG. 11 presents an example block diagram 1100 of a circuit block 1110. In this diagram the components of the circuit block are a power supply 1101; a voltage monitor 1102; a current monitor 1103; an energy meter 1104; a central processor 1105; an output 1106 (LED, LCD, relay); and an RF transceiver (remote cutoff) 1107.

The power supply 1101 provides stable, filtered power for the circuitry, mainly +5V and +3.3V. Power can be converted using one of two methods. The first is a non-isolated method, where the main AC voltage is converted to high voltage DC via a rectifier (either half-wave or full-wave). The high voltage DC is fed into a switching regulator configured as a Buck (step-down) regulator. The output of the regulator is filtered and passed through a linear regulator. The second is an isolated method, where the main AC voltage is converted to low voltage (−6.3 VAC) AC via a transformer. The low voltage AC is then converted to low voltage DC via a rectifier (either half-wave or full-wave). The output of the rectifier is filtered and passed through a linear regulator.

The voltage monitor 1102 provides amplitude, frequency, and phase information using one of two methods. The first is a non-isolated method, where the main AC voltage is passed through a resistive voltage divider to scale the voltage. The resulting voltage across the sampling resistor is +/−70 mVAC. The second is an isolated method, where the main AC voltage passed through a voltage transformer. Current is limited via a series input resistor and a load resistor is placed in parallel with the output coil. The resulting voltage across the sampling (load) resistor is +/−70 mVAC.

The current monitor 1103 provides amplitude, frequency, and phase information using one of two methods. The first is a non-isolated method, where a shunt resistor (typically 1 mOhm) is places in series between the main AC neutral wire and the load side neutral wire. This resistor will develop a voltage that is proportional to the current flowing through the load. Typical voltage levels are +/−35 mVAC. The second is an isolated method, where one of the load-side AC wires are passed through the center of a current sense transformer. The current transformer has a load, or sampling resistor placed in parallel with the secondary winding. Typical voltage levels across the sampling resistor are +/−35 mVAC.

The energy meter 1104 samples both the voltage and current, calculates the phase difference and calculates power (sources or consumed). Given the relationship between the voltage and current phase angles, "direction" of flow can be established.

The central processor 1105 is responsible for base communication, computation, and conversion of the data between the various portions of the circuit The output 1106 has three main functions: overall status, detailed status, and disconnect. The overall status is displayed using a bi-color LED. Green indicates a closed relay with flow in the desired direction, while red indicates a reverse flow or remote disconnect request has been detected. As a result, the relay is command to open, disconnecting the load from the source. The detailed operating conditions are displayed on a 128×64 OLED. Voltage, current, power, and remote switch status is displayed. Disconnect is accomplished via a relay. The normally closed portion is used to avoid excess power consumption. When a disconnect condition is detected, the relay coil is energized and the contacts are open. The normally open contacts can be used as well, by reversing the control logic: energize while no disconnect conditions exist. This may provide some fail-safe (defaults to open) benefits.

The RF transceiver 1107 provides two-way communication with a remote disconnect switch. Both presence and message content are evaluated. If the signal goes missing, the system can be configured to open or close the relay. If the signal is missing, the OLED will display a remote switch status of "None." If the signal is present, then the content is evaluated. A series of data bytes is used to avoid false triggering. If the correct sequence is received, the switch is considered not to be requesting a disconnect; otherwise, the switch is considered to be requesting a disconnect. If requesting a disconnect, the OLED will display a remote switch status of "On;" if not, it will display a status of "Off."

In an example, the A/C diode or breaker monitoring and/or control system described herein may be integrated into a smart-connected DER. The smart-connected DER includes a housing that houses a DER meter, whole building meter, Ethernet bridge, communications module, DER relay, circuit breaker, and/or terminal block, and/or subcombinations thereof In one embodiment, a stand-alone box gives an audible warning (such as a beep) if a load current is above 0.1 amp.

In another embodiment, a stand-alone box transmits a warning if a load current is above 0.1 amp. The stand-alone box may transmit the warning via PLC or via a wireless protocol, including, but not limited to cellular protocols.

In another embodiment, a stand-alone box opens a normally closed (NC) relay if a load current above 0.1 amp. This effectively shuts down solar production. The relay may be placed in either the AC or DC wiring; however, in the AC wiring, one relay is used per breaker to reduce costs. The relay can be NO, NC, or stable in either position.

In another embodiment, a stand-alone box trips a ground-fault circuit interrupter (GFCI) circuit breaker if a load current above 0.1 amp. Instead of actuating an in-series relay, this would trip a commercially available breaker by mimicking a ground fault.

In another embodiment, this function is placed within a home power monitor. If a load current is above 0.1 amp, the monitor interface is used to send a warning or mitigate the overload (e.g., trip a circuit breaker) wirelessly via a command inverter or microinverter. Opening the circuit with a relay is electrically similar to commanding the microinverters (or other DER) to shut down.

In another embodiment, this function is incorporated into a circuit breaker. This breaker would be colored leaf green to meet code regulations, as black circuit breakers are for current consumers and bright or leaf-green green circuit breakers are for current producers. This mechanically and electrically enforces the dedicated circuit rule.

In another embodiment, the breaker or panel's physical features are altered to restrict the potential location of the circuit breaker in the panel and the total numbers of current-producing green circuit breakers as is done for piggy-back circuit breakers now.

In another embodiment, a housing may integrate an AC diode. This is functionally a diode in the sense that it permits current in only one direction. The housing houses a circuit board and electronics to provide the AC diode operation. A processor and memory are included with non-transitory instructions stored therein to read the monitor chip, and generate an output. In some example, the housing may include an integrated LCD window to show Voltage, Current, Power, Energy, and power history. A wireless board may be included to send a message to a user device that can receive wireless communications. In another alternative or additional example, a bi-color LED (Red/Green) may be included to show the system status.

With regard to monitoring, in some embodiments, a wireless ESP module may be included. This will enable the AC diode to send (and receive) data to a cloud, to opens up web-based and phone-based monitoring. Since the device can receive data, one can remotely turn off the breaker.

In embodiments where there is no export of data out of the AC diode, monitoring of the mains may be provided. For example, a system may monitor the mains to display the overall energy consumption and direction. Zero export may be a simple PID controller with the feedback being current at the mains. As long as the current at the mains is near zero or flowing into the house, there is zero export. Zero export can be enforced conventionally by throttling microinverter output or less conventionally by adding load (perhaps a water heater, freezer, or battery charging).

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, are also regarded as included within the subject matter of the present disclosure.

The invention claimed is:

1. A system, comprising:
an alternating current (A/C) diode configured to prevent or reduce power flow in an unintended direction; and
a processor and non-transitory memory with instructions stored therein configured to detect a mismatch of a distributed energy resource generated current and a circuit breaker current and to generate an output if a mismatch is detected.

2. The system of claim 1 coupled in a circuit breaker.

3. The system of claim 1 wherein the distributed energy resource generated current is generated at one or more solar panel microinverters.

4. The system of claim 3 wherein the A/C diode is a controlled A/C diode.

5. The system of claim 4 wherein the processor generates an output that is at least one of an audible output and a visual output.

6. The system of claim 5 wherein the output opens a normally closed relay in response to load current greater than a non-zero positive threshold below 0.1 amp or wherein a relay shuts down current generation of a power generation device system coupled to the circuit.

7. The system of claim 6 wherein the relay is positioned in one or more of the circuit or the DC wiring of the power generation device system, which is a solar array.

8. The system of claim 4 wherein the processor generates an output that is a digital output.

9. The system of claim 8 wherein the output is responsive to an identified current direction being detected.

10. The system of claim 9 wherein the output is further responsive to a load current level above a threshold.

11. The system of claim 10 wherein the digital output is a communication signal to another electronic device wirelessly and/or wired, and wherein the one or more solar panel microinverters are coupled to a universal monitor, wherein the universal monitor is coupled to a cloud service, wherein the universal monitor includes a library of solar panel microinverter serial ID numbers and corresponding communication structures, and wherein solar panel microinverter serial IDs and corresponding communication structures are added to the library from the could service.

12. The system of claim 5 wherein the visual output is an integrated LCD window showing one or more of: voltage, current, power, energy, and power history.

13. The system of claim 12 wherein the visual output is a bi-color LED.

14. A system, comprising:
an alternating current (A/C) diode including a relay and configured to prevent or reduce power flow in an unintended direction coupled with one or more solar panel microinverters, the microinverters coupled with a circuit of a building to provide power to the circuit; and
a processor and non-transitory memory with instructions stored therein configured to detect whether the circuit is a shared with a power consumer based on detecting a mismatch of a distributed energy resource generated current and a circuit breaker current measured at a circuit breaker for the circuit, and to shut down the circuit when a shared circuit is detected.

15. The system of claim 14 wherein the distributed energy resource generated current is a sum of current from a plurality of microinverters.

16. The system of claim 15 wherein the processer further includes instructions to generate a visible light output based on the detection of the shared circuit.

\* \* \* \* \*